United States Patent Office 3,426,781
Patented Feb. 11, 1969

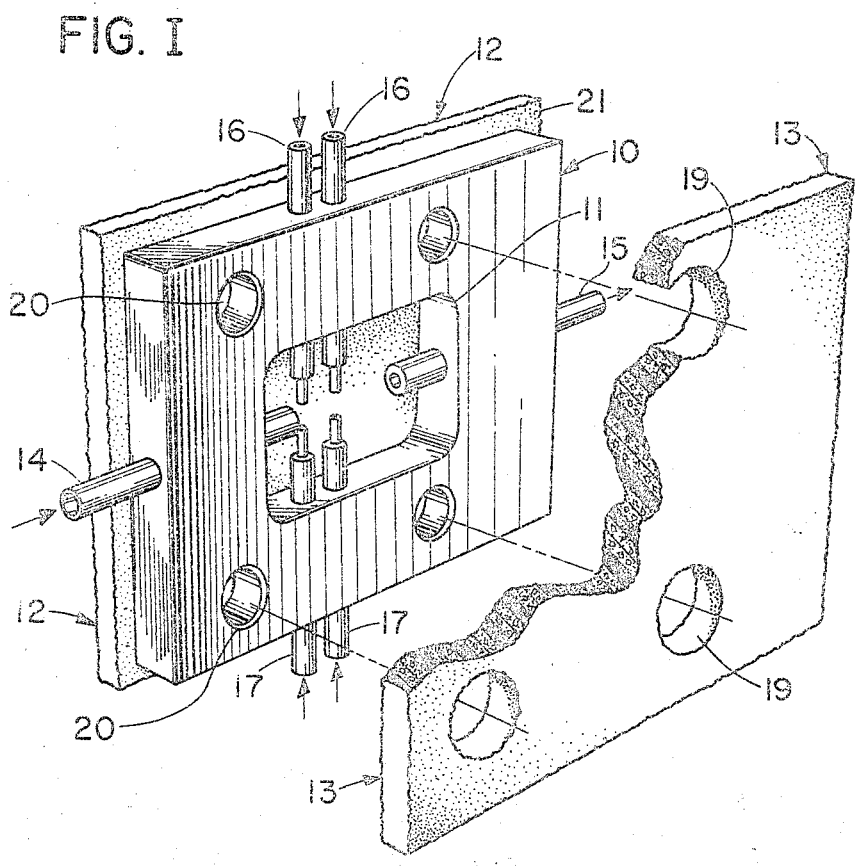

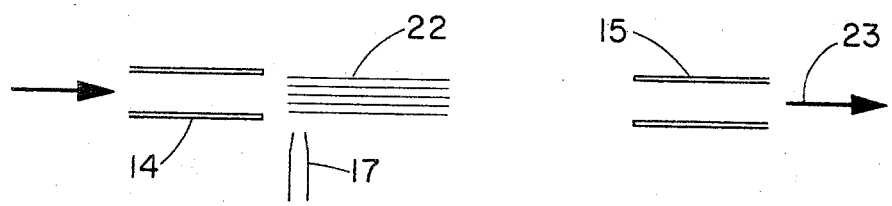
FIG. II
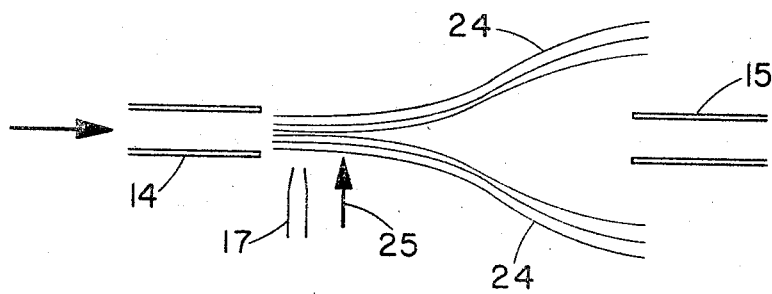
FIG. III

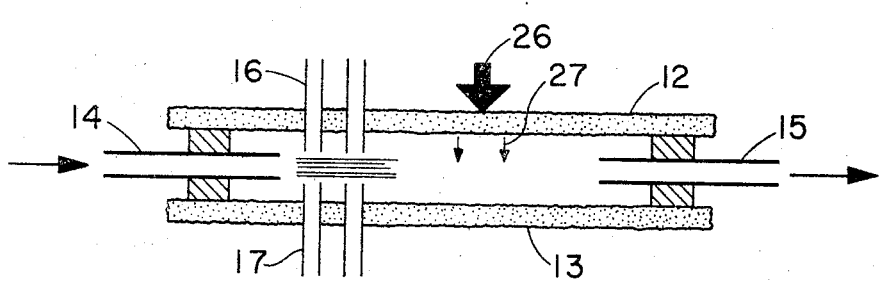
FIG. IV
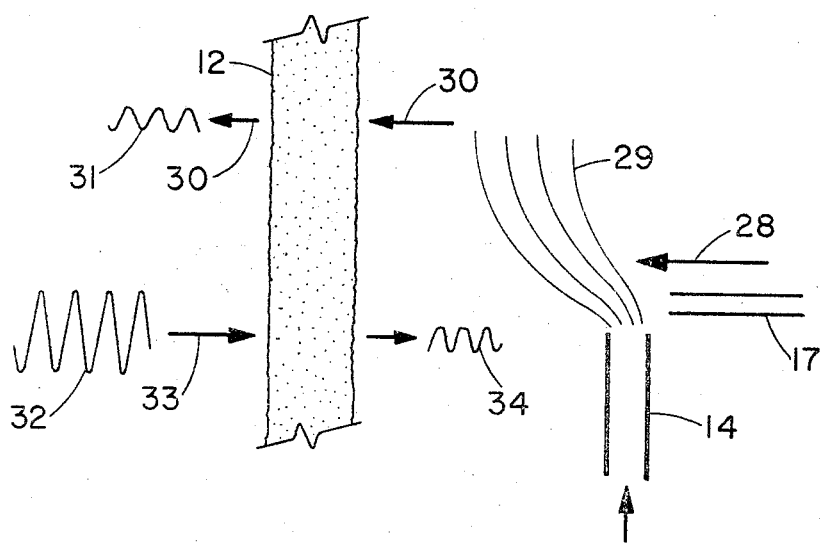
FIG. V

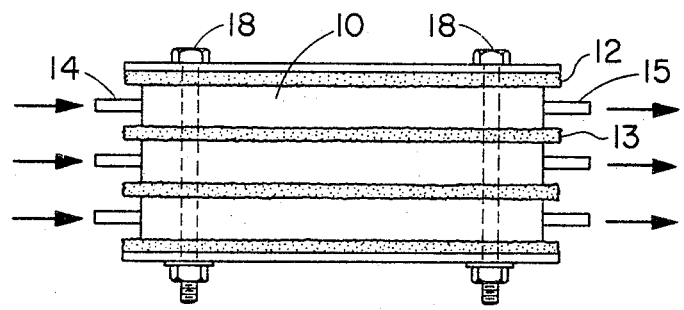
FIG. VI
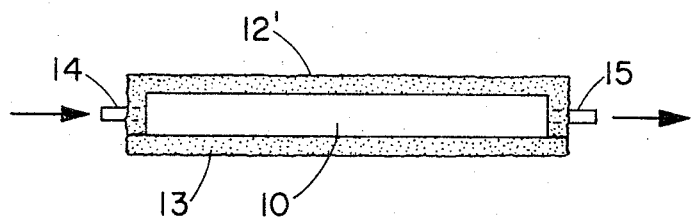
FIG. VII

3,426,781
FLUID LOGIC DIFFUSION UNIT ASSEMBLY
Herbert A. Neuman, Wrentham, Mass., assignor to The Foxboro Company, Foxboro, Mass., a corporation of Massachusetts
Filed Jan. 20, 1967, Ser. No. 610,678
U.S. Cl. 137—81.5      5 Claims
Int. Cl. F15c 1/14

ABSTRACT OF THE DISCLOSURE

A fluid logic diffusion unit with an operating chamber walled by porous material to provide fluid escape while protecting the unit from external disturbance.

---

This invention relates to fluid logic devices and has particular reference to diffusion modules and assemblies. The fluid is, ordinarily, air.

Diffusion modules of this nature involve a power fluid flow through an input pipe, across an open gap, and into an output pipe.

Control function of such modules is accomplished by fluid control inputs applied transversely to fluid flowing across the open gap. The result is to diffuse the fluid power flow so as to substantially reduce flow into the output pipe.

In this manner fluid exiting from the output pipe is on a logic basis of on-off or one-zero.

Diffusion modules are very useful in many applications because of their simplicity and because of the other inherent advantages of fluid logic devices. Pilot devices of this nature provide control of substantial fluid power flows by the application of small control signals.

A considerable problem exists in the operation of fluid diffusion devices. External noises or shocks can set up extraneous unwanted control effects which can cause diffusion of the open fluid flow when no control signal is intended.

In the prior art, some protection has been afforded by enclosing the operating area of the diffusion unit. It has, however, been necessary to provide a substantial exit opening in the enclosure so that diffused fluid may escape. Otherwise the open flow could be permanently blocked or disturbed. Accordingly, the modules still were undesirably subject to extraneous noise due to the air vibrations, and to pulsations within the enclosure when the outside was hit with something. On occasion, dropping a dime on a diffusion unit has been enough to cause a change of state in the unit.

The present invention obviates these prior art difficulties and provides a new, useful and non-obvious invention.

It is an object of this invention to provide a fluid logic diffusion unit assembly which is operationally fully effective, while being impervious to external shock waves or impact on the assembly itself.

Other objects and advantages of this invention will be in part apparent and in part pointed out hereinafter and in the accompanying drawings, in which:

FIGURE I is a perspective, in part exploded, of an assembly according to this invention;

FIGURE II is a schematic of a fluid diffusion unit with no control signal;

FIGURE III is a schematic of a fluid diffusion unit with a control signal applied thereto;

FIGURE IV is an illustration of a fluid diffusion unit assembly according to this invention, illustrating the function of the protective wall against impact;

FIGURE V is a schematic, illustrating diffusion fluid exit and external shock wave protection according to this invention;

FIGURE VI illustrates a complex of fluid assemblies according to this invention; and FIGURE VII illustrates a variant of the protective wall form according to this invention.

Throughout the various drawing views, like reference numbers are applied to like elements.

In FIGURE I a fluid logic diffusion unit assembly comprises a central body 10. This is a narrow rectangular block with a large, rectangular chamber opening 11 centrally located and extending therethrough. This opening 11 becomes a fully enclosed chamber by the application of side walls 12 and 13 thereto.

A fluid power flow input pipe 14 extends through the left edge of the body 10 into the chamber 11. A fluid output pipe 15 extends from the chamber 11 through the right edge of the body 10. Within the chamber 11, the output pipe 15 is spaced from and exactly aligned with the input pipe 14.

Fluid power flow, when undisturbed, thus flows into the chamber 11 through pipe 14, flows across the gap between pipes 14 and 15 in a free flow stream, and exits through pipe 15. Through the top and bottom edges of the body 10, fluid control inputs 16 and 17 are provided to apply fluid jets against the free power flow from pipe 14 to pipe 15 within the chamber 11. Diffusion of the free power flow is accomplished by small force control signals since the point of control application is adjacent the exit point of the power flow fluid input pipe 14.

Any one of the control inputs can be enough to diffuse the free power flow sufficiently to prevent an effective output signal from the pipe 15. The various control inputs 16 and 17 may be used in various control programmings singly or together, as desired.

The side walls 12 and 13 are provided for the assembly to complete the enclosure of the chamber 11 and provide an operating area for the fluid flows of this device.

The walls 12 and 13 are preferably formed of a relatively flexible and soft porous material such as an open pore urethane plastic foam.

The central body 10 is sandwiched between the protective sides 12 and 13. Assembly is made by bolts 18, see FIGURE VI, extending through openings 19 in the side walls 12 and 13, and 20 in the central body 10. The side walls 12 and 13 are larger in area than is the central body 10. Accordingly the edges of the side walls 12 and 13 extend beyond the central body as indicated at 21. This provides protection for the edges of the central body 10 from impact. A blow on the central body 10 can set up undesirable fluid waves in the operating chamber 11. Thus the edges of the side walls 12 and 13 protect against diffusion of the open fluid stream between pipes 14 and 15, due to external impact.

In the operation of the devices, fluid in the chamber 11 as diffused by a control signal from one of the control inputs 16 or 17, must escape from the chamber 11. This is accomplished through the porous side walls 12 and 13. At the same time, air waves set up by sharp external noises are muffled by the porous side walls, and the open flow between pipes 14 and 15 is not disturbed.

In FIGURE II, undisturbed free fluid flow 22 is shown as between input 14 and output 15, with no signal from the control input 17, and an output signal exiting from pipe 15 as at 23.

In FIGURE III, diffused flow is indicated at 24 as a result of control signal 25 in pipe 17. In this instance there is no effective output signal from the pipe 15.

In FIGURE IV an undesired external impact, such as an object hitting, is indicated by arrow 26. The internal effect is negligible as indicated by small arrows 27. The free flow is undisturbed, and in the absence of control signals from the control inputs 16 and 17, there is an output from the pipe 15.

In FIGURE V, with a control signal applied in pipe 17 as indicated by arrow 28, the power fluid flow is diffused as at 29 and escapes through the porous wall 12 as indicated by arrows 30 and small amplitude wave 31. Also an external loud noise is indicated by large amplitude wave 32 and arrow 33. This is dampened by the wall 12, and results in a small internal wave 34 if at all which would be ineffective to disturb the free flow of power fluid, assuring the control signal 28 then to be absent.

In FIGURE VI a complex of fluid logic diffusion unit assemblies indicates that many can be used together. This complex can, for example, be in the nature of a cube and with dimensions of the order of an inch. The escaping diffused fluid in this case exits from the edges of the porous walls. Any entrance to adjacent units is so gentle as to be harmless.

The alternate structure of FIGURE VII illustrates a porous wall 12 which may be angled to cover the edges of the central body 10, as well as providing its usual side wall functions.

As many embodiments may be made in the above invention and as changes may be made in the embodiment set forth above without departing from the scope of the invention, it is to be understood that all matter hereinbefore set forth or shown in the accompanying drawings, is to be interpreted as illustrative only and not in a limiting sense.

I claim:
1. A fluid logic diffusion unit assembly comprising:
a housing, a fully enclosed operating chamber in said housing, a fluid power flow input to said chamber,
a fluid power flow output from said chamber, said output being in alignment with said input and spaced therefrom to provide an open fluid flow from said input into said output within said chamber,
at least one control input to said chamber, located to direct a control input fluid jet against said open fluid flow, transversely thereof and at a point near the exit end of said power flow input, said control input being effective to diffuse said open fluid flow to divert a substantial part thereof from entering said fluid power flow output,
said chamber having narrow end, top and bottom walls, and side walls of substantial areas,
said side walls being formed of soft porous material to provide for gentle escape from said chamber of fluid diffused from said open flow, and to provide protection for said open flow with respect to substantial fluid disturbance within said chamber causable by disturbances exemplified by sharp external sounds and actual solid external impingements on said central housing.

2. A diffusion unit assembly according to claim 1, wherein said side walls are formed of open-pore urethane plastic foam.

3. A fluid logic unit complex comprising several diffusion unit assemblies according to claim 1, said assemblies being joined to form a single body.

4. A fluid logic unit complex comprising several diffusion unit assemblies according to claim 1, said assemblies being joined to form a single body, the said side walls of said assemblies extending outward beyond the housings of said assemblies to provide protection for said housings.

5. A diffusion unit assembly according to claim 1, wherein one of said side walls extends in angled form over an outer edge of the housing of said assembly, in protective relation with said outer edge.

References Cited

UNITED STATES PATENTS

| | | | |
|---|---|---|---|
| 3,182,674 | 5/1965 | Horton | 137—81.5 |
| 3,234,955 | 2/1966 | Auger | 137—81.5 |
| 3,259,314 | 7/1966 | Hatch | 137—81.5 X |

M. CARY NELSON, *Primary Examiner.*

WILLIAM R. CLINE, *Assistant Examiner.*